Jan. 9, 1962

R. W. GRISWOLD II 3,016,213

BLUNT-TAILED JET AIRFOIL

Filed June 7, 1956

INVENTOR.
ROGER W. GRISWOLD II

BY
Frank H. Borden

Jan. 9, 1962 R. W. GRISWOLD II 3,016,213
BLUNT-TAILED JET AIRFOIL
Filed June 7, 1956 3 Sheets-Sheet 2

*INVENTOR.*
ROGER W. GRISWOLD II
BY
*Frank H. Borden*

Jan. 9, 1962 R. W. GRISWOLD II 3,016,213
BLUNT-TAILED JET AIRFOIL
Filed June 7, 1956 3 Sheets-Sheet 3
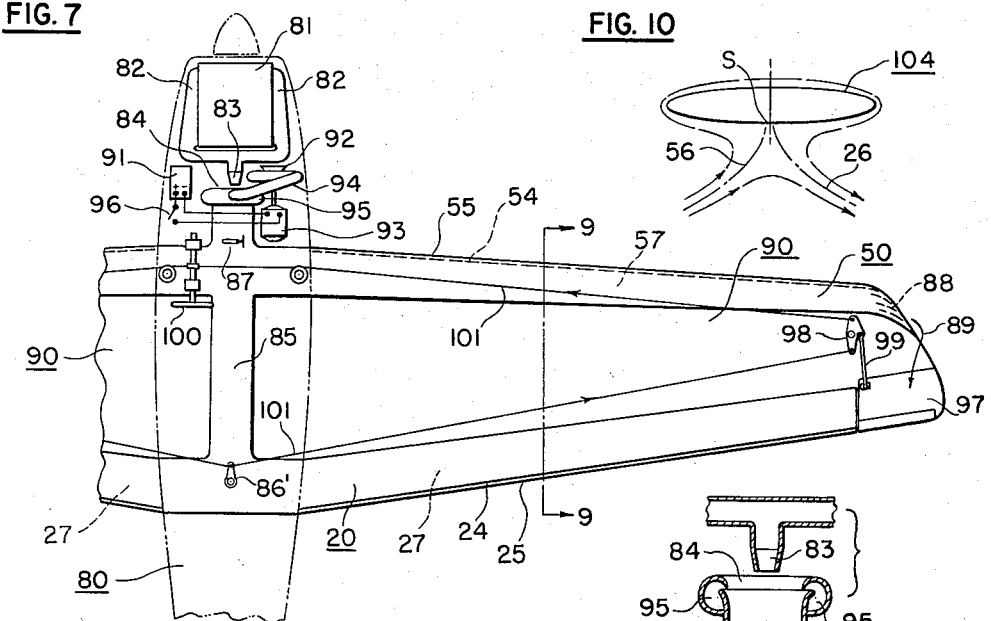
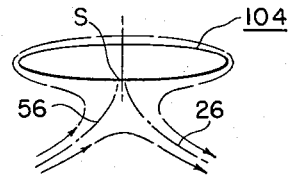
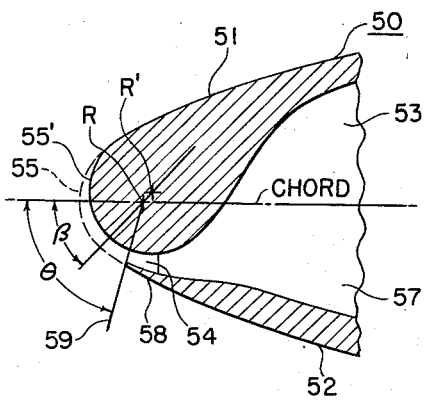
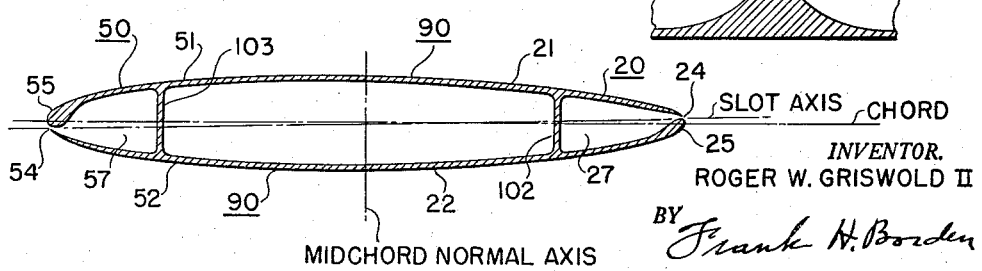
INVENTOR.
ROGER W. GRISWOLD II
BY Frank H. Borden United States Patent Office 3,016,213
Patented Jan. 9, 1962

3,016,213
BLUNT-TAILED JET AIRFOIL
Roger W. Griswold II, Old Lyme, Conn.
Filed June 7, 1956, Ser. No. 590,068
13 Claims. (Cl. 244—42)

This invention relates particularly to circulatory flow blowing jet means in blunt-tailed airfoils for both fixed and rotary wing applications which are effective to provide jet-induced and pneumatically-stabilized circulation thereover, whereby the lift is increased, the drag is reduced, and thrust is provided by such means, as selectively controlled functions of the relative momentum of the jet and the airfoil configuration. The several elemental forms of the invention, presage: (1) the elimination of mechanical-type flaps and their requisite operating gear in certain applications of the invention to fixed-wing aircraft; (2) application to rotary-wing aircraft of strictly pneumatic flow control and blade rotation means without moving parts in the rotor blades, per se; and also, (3) use of a compound reflex-action trim-control nozzle-flap to maintain substantially constant pitching moments on the airfoil in new and improved types of jet-wing aircraft which will be capable of steep gradient slow speed performance in a generally horizontal aircraft attitude, in particular, additionally to improved performance for such type aircraft throughout a greatly extended speed range.

The classic effectively sharp trailing edge of the conventional airfoil functions to cause break-away of the terminal local flow and to thus essentially fix the rear confluence streamline and its associated stagnation point proximate to such sharp edge. Consequently the lift with conventional simple airfoils is dependent entirely upon angle of attack changes, being limited to relatively low values by the stall thereof which is initiated by trailing edge separation, and is further dependent upon camber changes if the airfoil includes a flap device of one kind or another. Additionally to such limited lift capability, the mechanical expedient of the sharp-tailed configuration is inherently deficient for effecting substantial pressure recovery on the airfoil which incidentally accounts for the excessive pressural drag of the conventional airfoil.

With simple blunt-tailed shapes there is no device to fix the rear stagnation point and thus the circulation about the airfoil—at least theoretically in the absence of viscosity. The essential feature of the instant invention comprises the simple combination of a terminal blowing jet in a blunt-tailed airfoil disposed on the negative pressure field side of the airfoil chord line wherein the jet is so designed and proportioned momentum-wise and directed for tangential confluent discharge with the circulatory flow thereover as to remain attached over the rounded trailing edge and selectively to flow forward along the opposite surface in the positive pressure field of the airfoil. The momentum of such a circulatory jet and that of the consequently entrained and augmented confluent local flow, is matched with that of the opposing local flow over the opposite surface, so as to stabilize pneumatically the stagnation streamline incident to impingement of these flows and thus control the position of its associated rear stagnation point throughout an extremely wide selective range of displacement. Accordingly, the resultant jet-induced and pneumatically-stabilized circulation about such a blunt-tailed airfoil, will be directly controlled within correspondingly large limits functional with the relative momentum of the jet and the airfoil configuration, independently of any change in either incidence or camber of the airfoil. Within this balanced operational range of momentum wherein jet attached and stabilized flow is maintained by such an elemental circulation control (hereinafter designated as CC) system, no flap device nor other moving parts of any kind are required in the airfoil, per se, since the same fluid-dynamics device which controls the magnitude of the circulation also stabilizes it along the rear stagnation streamline as the consequence of the equalized velocities and pressures which are pneumatically established thereat functionally with the jet momentum for a given powered airfoil configuration.

The prior art has evolved various types of powered-airfoil blowing jet configuration wherein the jet either, intersects and cuts directly across the circulatory flow adjacent to the sharp trailing edge which comprises what is herein generically designated as the conventional jet flap (as distinguished from the blunt-tailed circulatory jet airfoil of this invention), or, if confluent with the circulatory flow as with the usual type of upper surface blowing configurations, such jets are restricted in their circulation-increasing potentialities by divers limitations, usually by a sharp trailing edge, also by devices to convert the airfoil from a sharp to a rounded rear end and vice-versa, or by inadequate means to control the flow without separation over the blunt-tailed shape. Thus, the prior art has accordingly failed to achieve the true circulatory-jet-airfoil structure which will provide the optimum desired functional effects, as herein fully specified by means which are effective to completely avoid the foregoing limitations.

It is among the objects of this invention to provide in circulatory flow blunt-tailed jet airfoil systems: jet-induced and pneumatically-stabilized circulation, minus movable airfoil parts; direct-lift independently of incidence; generally symmetrical streamlines bilaterally of the midchord normal axis of the airfoil with correspondingly uniform pressure distribution and the resultant thereof correspondingly centered on the airfoil; forward movement of the jet reaction on the airfoil functional with increasing effective angles of jet deflection; essentially complete pressure recovery on the airfoil; CC effects in a blunt-tailed airfoil; jet-induced boundary layer control (hereafter designated as BLC) effects with corresponding reduction of drag; thrust recovery from the blowing jet, additionally to its CC and BLC effects; control of downwash angles over the airfoil through a maximum range of displacement; coupled convergent and divergent movement of the airfoil front and rear stagnation streamlines, functional with respectively increasing and decreasing relative jet momentum, whereby rearward travel of the front stagnation point is accompanied by generally similar forward travel of the rear stagnation point; an effectively single stagnation pressure point on or proximate to the airfoil, at ultimate permissible limits of jet momentum; pneumatic means to effectively convert a blunt-tailed airfoil shape to the functional equivalent of an ideal sharp trailing edge configuration at high speeds; direct jet reaction thrust-lift, jet induced circulation-lift and complemental thrust effects on the airfoil; maintenance of the centers of pressure due to both the jet-reaction and the jet-induced lift proximate to the midchord of the airfoil, substantially independent of jet deflection or momentum; a jet aligned with and discharging in the direction of the circulation about the airfoil; airfoil anti-icing by means of heated leading edge blowing jets; automatic cyclical flow control in rotary-wing aircraft with constant-pressure blowing jets; elimination of the stall phenomenon throughout a wide range of negative to positive incidence; and other objects and advantages will become apparent as the description proceeds.

In the accompanying drawings:

FIGURE 1 is a chordwise trailing edge cross section of a blunt-tailed airfoil of the invention incorporating the simple terminal circulatory flow blowing jet disposed in the upper surface in this instance, which discharges tangentially confluent with and in the direction of the circulation over the airfoil but in opposition to the local flow over the opposite surface thereof, with the resultant terminal flow streamlines partially shown for a condition of relatively low jet momentum wherein the velocity ratio of the jet relative to the free-stream flow is approximately unity or somewhat higher, which configuration is effective pneumatically to reduce drag at high speeds to comparable and even lower values than that of the counterpart sharp-tailed airfoil, depending upon the incremental jet momentum, and further effects substantially complete pressure recovery on the blunt-tailed airfoil as is indicated by the abrupt change in direction of the local flow streamlines which is inherent when such a unique powered airfoil configuration is correctly designed, as is particularly specified by FIGURE 10, to be described.

FIGURE 1a depicts the FIGURE 1 blunt-tailed section for a condition of appreciably higher jet momentum wherein the jet velocity is several times that of the free-stream relative airflow, with the resultant terminal flow streamlines partially showing the consequent substantial shift downwardly and forwardly of the rear stagnation streamline with correspondingly increased downwash and circulation over the airfoil, which configuration is effective pneumatically to increase lift accordingly with minimal concurrent increase of drag.

FIGURE 2 is a chordwise trailing edge cross section of a blunt-tailed circulatory jet airfoil incorporating the essential features of the FIGURE 1 terminal airfoil section, energized either separately from or in combination with the low-moment type of jet flap system similar to that disclosed by FIGURE 12 in applicant's copending application Ser. No. 538,690 filed October 5, 1955, now abandoned, wherein the large total momentum of the compound circulatory blowing jets is sufficiently high to provide complete self-propulsive and substantial direct-lift effects in such an integral lift-propulsor airfoil system, with a high-lift adjustment of the reflexed-flap system as used for slow speeds shown by solid lines, to which configuration the indicated partial streamlines apply, an intermediate speed adjustment being shown by the dotted lines, and the maximum thrust adjustment of the flaps in the high speed range being shown by dash and dot lines, whereby the resultant pitching moments are maintained substantially constant throughout the lift coefficient range of the airfoil.

FIGURE 3 is a chordwise leading edge cross section of a plain airfoil which may be used in combination with either the simple or the compound circulatory jet blunt-tailed airfoil sections of the FIGURES 1 or 2 types, respectively, to comprise an airfoil having biconvex leading and trailing edge sections (except for the slot discontinuity, in the latter case), with the entry flow streamlines partially shown for a condition of low circulation about the airfoil.

FIGURE 4 is a chordwise leading edge cross section of an airfoil incorporating a nose circulatory flow blowing jet which discharges tangentially confluent with the circulation but generally opposite in direction to that part of the local flow which passes over the same surface of the airfoil, similar to the leading edge blowing jet configuration disclosed by FIGURE 2 in applicant's copending application Ser. No. 426,665 filed April 30, 1954, now matured into Patent No. 2,927,748 dated March 8, 1960, which likewise is herein intended to be used in combination with either the FIGURES 1 or 2 types of blunt-tailed airfoil sections, to comprise other forms of compound circulatory jet airfoils having biconvex surfaces (again excepting slot discontinuities) about the transverse axes thereof, with the resultant entry flow streamlines partially shown for a condition of blowing jet velocity ratio approximately the same as that indicated by FIGURE 1a, which configuration is effective, likewise by pneumatic means alone, to further augment the circulation about the airfoil, to appreciably delay the stalling angles-of-attack, and to provide substantial thrust recovery of the initial jet momentum, in a dual circulatory jet blunt-tailed airfoil system.

FIGURE 5 is a chordwise leading edge cross section of a ducted airfoil incorporating a split-entry ejector blowing jet configuration similar to that disclosed in said application Ser. No. 538,690, which likewise may be used in combination with either the FIGURES 1 or 2 type of blunt-tailed sections to comprise still other forms of compound circulatory jet airfoils, with the resultant entry flow streamlines partially shown for a condition of aspirator mass flow generally corresponding to the efflux mass flow conditions indicated by FIGURE 2.

FIGURE 6 is a chordwise leading edge cross section of a discontinuous type of supersonic airfoil incorporating a shorp entry wedge with supercritical velocity blowing jets interposed therebetween and the adjacent recessed main airfoil profile, such jets being arranged to discharge rearwardly over both surfaces of the airfoil or over only one surface, similar to the organization disclosed in said copending application Ser. No. 426,665, which likewise may be used in combination with either the FIGURES 1 or 2 types of blunt-tailed sections to comprise additional forms of compound circulatory jet airfoils, with the resultant entry Mach cone and local flow streamlines partially shown for the high speed condition of the supersonically-expanding blowing jets, which configuration is effective to provide boundary layer control over the main airfoil surfaces at compressible flow speeds in the dual jet adjustment operatively indicated in this figure, while with only the upper surface jet operative (in this case) the airfoil leading edge is effectively converted to a functionally-bulbous entry with jet-induced and augmented circulation thereover to provide high-lift at low speeds for such type of supersonic airfoil.

FIGURE 7 is a schematic partial planview of an airplane wherein the wing incorporates the FIGURE 1 type of terminal circulatory blowing jet as a continuously and dependently operable flow control device incident to the operation of the primary powerplant by means of an exhaust-ejector coincidental engine cooling airflow system, in this case, and wherein the wing also incorporates the FIGURE 4 type of nose circulatory blowing jet as a supplemental transient-use flow control system operable as a booster device with respect to the first flow control system by means of an independent auxiliary stand-by powerplant which is further effective to maintain in the absence of primary powerplant operation, emergency operation of both powered high-lift systems for an acceptable period of time, and wherein the wing aileron control system is interconnected with valvular means for uniform or differential control of the terminal blowing jet to provide cooperative lateral control effects.

FIGURE 8 is an enlarged planview in section partially showing the dual-energized pump system of FIGURE 7 and connecting leading and trailing edge ducts.

FIGURE 9 is a chordwise cross sectional view of the wing taken on line 9—9 of FIGURE 7, showing the terminal circulatory blowing jet of the FIGURE 1 type and the nose circulatory blowing jet of the FIGURE 4 type which are both incorporated in the compound circulatory jet wing having a universally biconvex airfoil profile, other than for the surface discontinuities due to the slots.

Figure 1:
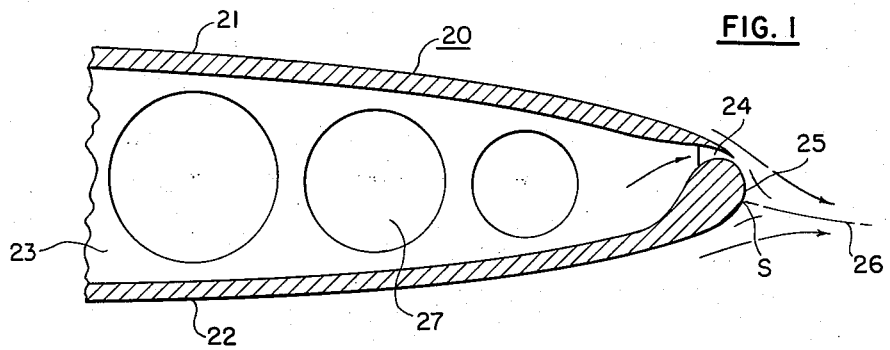

FIGURE 10 is schematically illustrative of the theory of the invention whereby the combination of circulatory flow blowing jet means with blunt-tailed airfoils is effective, in the first instance, to generally couple the rearward travel of the front dividing streamline with the forward travel of the rear confluence streamline as the jet momentum is increased, with resultant Magnus-type circulation similar to that about a rotating cylinder (as is also evident from the previously described figures), and secondly, this figure indicates the approximate ultimate magnitude of the circulation that can be both generated and stabilized by the pneumatic means of the invention alone, wherein the front and rear stagnation streamlines have come together in a common stagnation point near the midchord on the lower surface of the airfoil, the foregoing effects likewise resulting in generally constant center-of-pressure proximate to the midchord consequent from the nearly symmetrical streamlines bilaterally of the airfoil. In some cases such effective coincidence of the front and rear stagnation points may occur somewhat below the lower surface of the airfoil.

FIGURE 11 indicates the preferred order of specific slot design parameters for the nose circulatory blowing jet and when viewed inverted it likewise delineates the similar preferred slot design details for the terminal circulatory blowing jet.

It is pertinent to clarify at the outset, the terminology used herein the designate the characteristic dynamic-lift flow phenomena associated with operative airfoils. Dynamic lift can of course be provided by simply deflecting a jet toward the gravity field with consequent jet reaction thrust-lift, for which no free-stream flow nor airfoil for that matter is required. However the circulation-lift whereby conventional airfoils due solely to their profile configuration likewise deflect downwardly a corresponding mass flow per unit time to provide the requisite dynamic-lift, is a complex composite of the flow phenomena resulting from the imposition of a freestream translational flow upon the circulatory flow about the airfoil. The freestream is variously identified as the undisturbed, translational, linear flow, etc. The locally-displaced (or merely the local) flow about the operative airfoil, is comprised of the composite flow phenomena, i.e. the resultant of the translatory and circulatory flows which together determine what is usually identified as the circulation, wherein the consequent dynamic-lift on the airfoil is proportional to the relative magnitude of such circulation. Blowing jet powered airfoils are directly productive in the presence of freestream relative airflow thereover of both jet-reaction thrust-lift and jet-induced circulation-lift independently of angle of attack thereon.

With blowing jet powered airfoils the jet must obviously be energized by some sort of blowing device. The pressurized flow therefrom may comprise simply the efflux from a jet engine (primary or auxiliary) compressor bleed or by means of a separate blower operated by any suitable powerplant. Selective control means are herein provided to either vary the momentum of the blowing jet directly, or indirectly in a relative manner inversely with change in the airfoil's translational speed for the case of constant blowing jet momentum, or combinations of such selective control means may be used. For example, it may be preferable in some fixed-wing installations to control the jet momentum itself which will concomitantly also be controlled relatively by changing the aircraft speed, whereas in helicopter applications it will obviously be more convenient to simply supply constant blowing input to the rotor blade system wherein translational flight itself will provide automatically the design differential in relative jet momentum and thus the respective jet velocity ratios between the advancing and retreating blades.

Use of the word "tangent" to identify the relation between the arcuate jet discharge, the surface downstream of the jet and internally adjacent thereto, and the externally adjacent circulatory local flow (as well as otherwise used herein), conforms with the following definition of "tangent" given by the Shorter Oxford Dictionary, as reprinted in 1950, to wit: "a straight line which touches a curve (or a curved surface) i.e. meets it at a point and being produced does not (ordinarily) intersect it at that point." In other words, at the point of effluence of the jet it contacts the respectively adjacent curved surface of the airfoil and the local circulatory flow in substantial instantaneous parallelism therewith and in the direction of the latter flow to which the jet imparts kinetic energy by viscous shear transfer action.

Figure 1A:
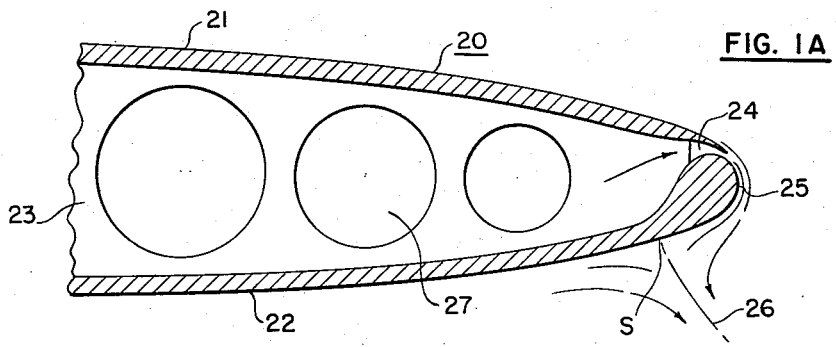

Referring to FIGURES 1 and 1a, the airfoil trailing edge section 20 is comprised of upper surface 21 and lower surface 22 mounted on rib 23 and spaced to form the upper surface terminal circulatory blowing slot 24 which is rearwardly directed and disposed in the generally negative pressure quadrant of trailing edge section 20 in communication with internal duct 27 and the external bulbous curved terminal surface 25 which comprises a continuation of lower surface 22. The specific design parameters relating to both the trailing edge slot 24 of FIGURE 1 and the leading edge slot 54 of FIGURE 4 to be described, are clearly delineated in considerable and precise detail in the subsequent specification of FIGURE 9 which is herewith included to serve that very purpose. The duct 27 is supplied with pressurized flow which discharges as a relatively high velocity jet from slot 24, the latter being so proportioned in relation to the momentum of the jet discharging therefrom and as further related to the degree and extent of curvature of rounded surface 25 that the blowing jet will remain attached to surface 25 without separating therefrom in its generally rearwardly and downwardly directed flow, as indicated in FIGURE 1, and its rearwardly downwardly and forwardly directed flow along lower surface 22, as indicated in FIGURE 1a. As is also indicated by the divergence of the partial streamlines in both of these figures, the blowing jet decelerates rapidly to zero relative velocity at the rear stagnation point S on lower surface 22 extending from which the stagnation confluent streamline 26 is defined by the region of equalized velocities and pressures between the divergent jet and the adjacent local circulatory flow over the upper surface, on the one hand, and the opposing lower surface local flow, on the other hand. It will be clear that the foregoing type of terminal blowing jet in combination with a blunt-tailed airfoil, discharging tangentially confluent with the circulation about the airfoil, will be effective to not only control the magnitude of the circulation by displacing the rear stagnation streamline but will also stabilize the latter as a function of and within limits of the momentum of the jet relative to that of the confluent and opposing local flows. According to particular design requirements and the desired lift-increasing effects, the jet may be extremely thin (as for example that issuing from a slot having an efflux nozzle width of the order of 0.0005 of the airfoil chord) in combination with very high jet velocity relative to that of the freestream translational flow over the airfoil—such relation being known as the jet velocity ratio—or alternatively, the jet may be quite thick (as for example that issuing from a slot having an efflux nozzle perhaps as wide as ½% of the airfoil chord) in combination with correspondingly reduced jet velocity, so as to provide generally the same jet momentum in either case. A wide range of alternative flow quantity versus the power required for such a blowing jet, may accordingly be selected according to particular applications.

Figure 2:
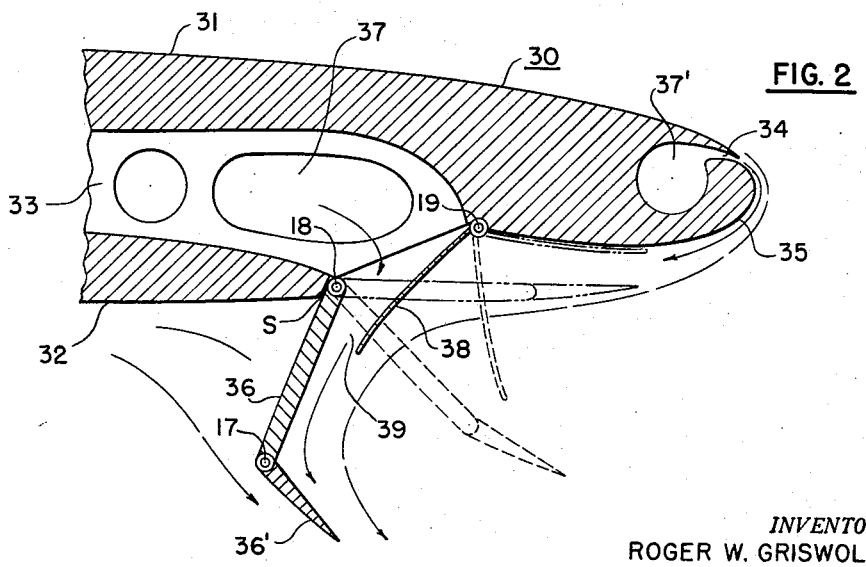
Figure 3:
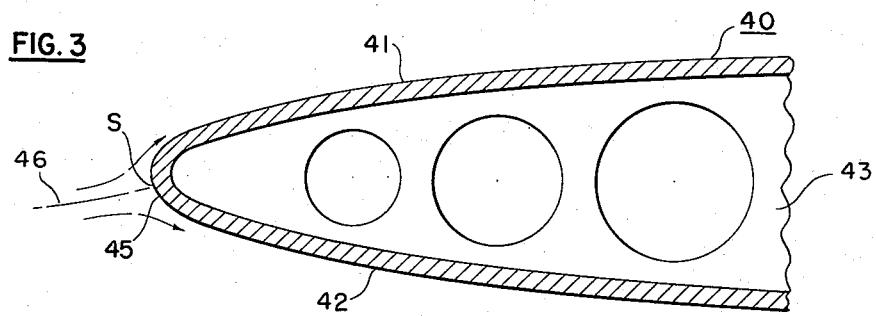

In the simplest essential form of the invention, the FIGURE 1 type of trailing edge section may be combined with the plain airfoil leading edge section 40 of FIGURE 3. Section 40 is comprised of upper surface 41 and lower surface 42 which are carried by rib 43 (or extensions of rib 23) and meet to form the conventional airfoil bulbous nose 45. FIGURE 3 also partially depicts the local flow streamlines passing over upper surface 41 and lower surface 42 either side of the entry dividing streamline 46 terminating in front stagnation point S on the leading edge of the airfoil. Alternatively, leading edge section 40 may be combined with the trailing edge section 30 of FIGURE 2, to be described.

Figure 4:
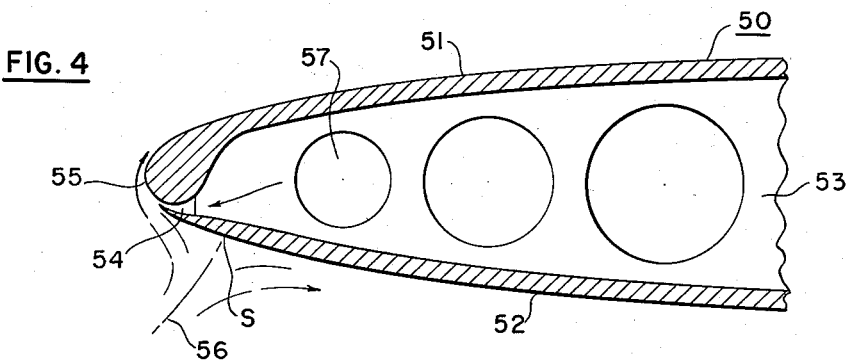

In FIGURE 4 leading edge section 50 comprised of upper surface 51 and lower surface 52 carried by rib 53 (or extensions of ribs 23 or 33) are spaced to form the lower surface nose circulatory blowing slot 54 which is disposed in the generally positive pressure quadrant of leading edge section 50 and is aimed generally opposite to the translational flow and toward the leading edge of the airfoil for blowing jet discharge tangentially confluent with the circulation over the curved surface 55 which comprises the leading edge of upper surface 51. The entry flow stagnation streamline 56 and its associated stagnation point S on lower surface 52 are shown in FIGURE 4 in relation to the adjacent local flow partial streamlines. The FIGURE 4 type of nose circulatory blowing jet was originally disclosed in applicant's copending application Ser. No. 426,665, from which it will be clear that the combination thereof with the FIGURE 1 type of terminal circulatory blowing jet, will provide an extremely powerful and direct CC couple for such blunt-tailed jet airfoils, since both jets are directed with the circulation in highly sensitive regions of flow control and the airfoil configuration is especially designed to fully utilize such a pneumatically controlled and stabilized system. It will be noted that such type of flow control system is unique in relation to its simplicity and the results achieved therewith, in that no moving parts of any kind are required within the airfoil configuration itself.

For high-powered applications to direct-lift types of aircraft wherein it is desired to use a terminal blowing jet of such substantial efflux momentum that the jet could neither follow the curved rear surface of the airfoil without separation nor maintain by itself stabilized circulation about the airfoil, due to its momentum being far greater than that of the opposing lower surface local flow, the trailing edge section 30 of FIGURE 2 provides compound circulatory blowing jet means especially adapted to resolve the foregoing type of flow control problem. Trailing edge section 30 is comprised of upper surface 31 and lower surface 32, relatively spaced and carried by rib 33 to form between said surfaces pressurized main duct 37, surface 31 terminating in blunt-tailed rear portion including rounded terminal surface 35 and also containing therein pressurized secondary duct 37', duct 37 terminating in the lower adjustable lift-propulsor terminal slot 39, and duct 37' terminating in the CC terminal fixed slot 34, slot 39 being formed by the juxtaposition of reflex-type compound flap 36—36' and respectively adjustable nozzle directing vane 38. It will be noted from FIGURE 2, as indicated by the assumed solid, dotted and dot and dash lines of this compound flap-nozzle system that the jet discharging from slot 39, can be controlled to react upon the airfoil substantially through almost any common pre-selected reference point, irrespective of a wide range of angular deflection of the jet relative to the airfoil. Accordingly, there is no practical limit to the momentum that can be applied to such type of direct-lift self-propulsive jet, other than the limits dictated by considerations of economy, since substantially constant pitching moments on the airfoil due to such jet reaction, can be attained, all as more fully recited in said application Ser. No. 538,690. In FIGURE 2 the rear stagnation streamline is not shown since reflexed flap 36—36' functions to provide the equivalent of a dividing streamline. Rear stagnation point S, however, is indicated at the upstream corner of flap 36 and lower surface 32, the latter two elements being pivotally joined at 18 and the reflexed trim flap element 36' is pivotally joined at 17 to main flap element 36. Nozzle directing vane 38 is pivotally joined at 19 to the forward edge of teminal surface 35. The foregoing pivotal elements are operative by mechanical, pneumatic, hydraulic, electrical or other suitable means which are well known to the art and which accordingly do not comprise of themselves any part of this invention. Ducts 37 and 37' may be pressurized from the same blowing jet source, or independently by separate power sources. As an example of the latter independent system, duct 37' might be supplied with compressor bleed air and duct 37 by lower pressure airflow from any suitable power source. It depends upon the desired performance, and, as previously noted, considerations of economy.

Figure 5:
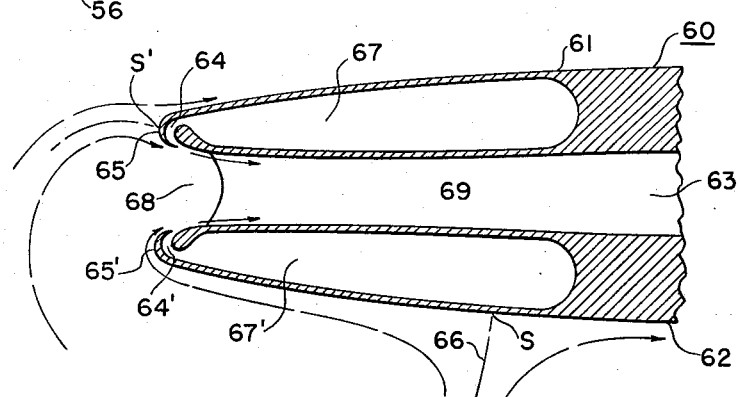

In FIGURE 5 a split-entry type of leading edge section 60 is comprised of upper surface 61 and lower surface 62 relatively spaced and carried by rib 63, to form internal ejector pasage 69. Upper surface 61 includes pressurized fluid duct 67 terminating in upper internally-directed ejector nozzle 64 and leading edge lip 65. Similarly lower surface 62 includes pressurized fluid duct 67' terminating in lower internally-directed ejector nozzle 64' and leading edge lip 65'. Upper and lower lips 65 and 65' respectively form split-entry 68 which together with ejector slots 64 and 64' respectively communicate with ducted airfoil passage 69 which illustratively may be coextensive with duct 37 of FIGURE 2. It will be clear that with the FIGURE 5 type of ducted airfoil the primary jets discharging from slots 64—64' will induce a secondary airflow into entry 68, the existent flow relations for a condition of realtively high blowing jet velocity ratio being partially indicated by the local flow streamlines wherein the front dividing streamline is indicated at 66 and its associated stagnation point S on lower surface 62, while a secondary dividing streamline and stagnation point S' between the flow passing into entry 68 and that passing over upper surface 61 occurs incident to upper lip 65 as indicated at S'.

Figure 6:
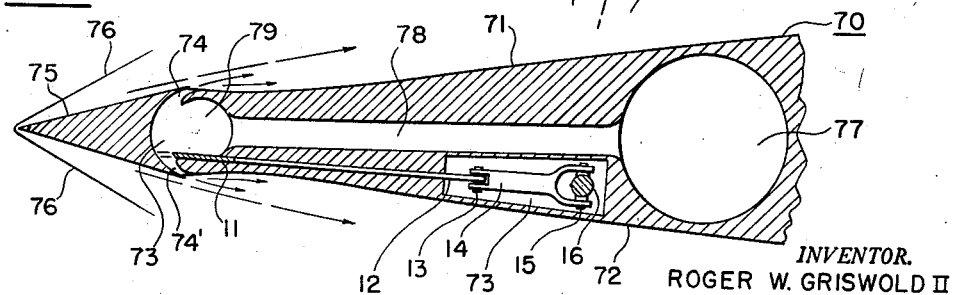

FIGURE 6 depicts leading edge section 70 of a supersonic arifoil having a discontinuous profile especially shaped for particular sonic operating speeds, comprising sharp-entry wedge 75 rigidly carried by interconnecting ribs 73—73 and spaced forwardly from main airfoil upper surface 71 and lower surface 72 respectively recessed below or inside of the imaginary continuation of the corresponding surface of wedge 75 to form respective upper and lower rearwardly-directed leading edge slots 74 and 74' communicating internally with local spanwise pressure duct 79 and main spanwise pressure duct 77 through interconnecting chordwise pressure duct 78. The optimum jet velocity ratios for particular operating speeds with both blowing jets operative in such type of flow control system, are variable according to the design aircraft speed, the airfoil local flow velocities, and the desired boundary layer control effects. For continuous operation at supersonic speeds, the jets issuing from slots 74—74' will preferably discharge supercritically, i.e. from the condition known as choked-nozzle blowing whereby the highly compressed flow of the order of two atmospheres or considerably more which is distributed through ducts 77, 78 and 79, expands supersonically after release from slots 74—74'. Such supersonic expansion of the blowing jets in the process of returning to ambient pressure, will accordingly effectively fill the space pneumatically between the recessed surfaces 71 and 72 and the region of substantial tangential confluence (at compressible flow speeds) with the adjacent local flow passing over wedge 75, such confluent flows likewise being so matched as to their respective velocities that the blowing jets will provide optimum boundary layer control effects at the design normal sonic operating speed of the aircraft. It obviously follows that the extent to which surfaces 71 and 72 are recessed depends upon the particular operating speed of the aircraft at which the desired supercritical blowing jet BLC effects are to be attained. The leading edge shock wave or Mach cone incident on wedge 75 at an assumed compressible flow operating speed, is indicated at 76—76.

Continuing with FIGURE 6, the series of local ducts 79, which each extend between spanwisely spaced ribs 73, contain in the lower portions thereof, the gate valve slide plate elements 11 controlled by chordwise push-pull rods 12, pivotally connected at 13 to drag links 14, which in turn are pivotally connected at 15 to spanwise main push-pull rod 16, slidably guided in the respective ribs 73 and controlled by suitable manually actuated means. It will be understood that slots 74—74' will normally both be open at supersonic aircraft speeds, as described above. For take-off and landing operations, however, valve elements 11 will be slid forwardly to the indicated dotted line position whereat lower slot 74' is effectively closed. The supercritically expanding jet discharging only from upper slot 74 in the presence of the relatively low subsonic local flow velocity prevailing in the slow speed range of the aircraft, will accordingly expand supersonically through a much wider divergent angle with reference to upper surface 71, than maintains for the high speed condition previously described, which will effectively convert sharp entry wedge 75 into the functional equivalent of a bulbous leading edge, in spite of the inconsequential region of local flow separation immediately adjacent the upper surface of wedge 75, with consequent substantial jet-induced circulation over the airfoil, thus providing acceptable slow speed performance for such type of supersonic aircraft. The foregoing high-lift flow phenomena with supercritical velocity flowing over the upper surface of such type sharp-entry supersonic airfoil, is schematically illustrated by FIG. 3a of said application 426,665, herein appearing as FIGURE 1. That same application likewise illustrates in its FIGURE 7 (herein appearing as FIG. 2) means whereby the sharp-entry wedge may be pivotally mounted on the main airfoil section to control the respective slots for the same functional effects. Such pivotal means could alternatively be used herein.

In FIGURE 7 and related FIGURES 8 and 9 which latter comprise enlarged views of certain FIGURE 7 components, the features essential to this particular complete aircraft application of the invention are shown by solid and by dotted lines, the remainder being shown in phantom. Airplane 80 comprises primary powerplant 81, of any desired type, engine exhaust ducts, or compressor bleed lines, 82—82, leading therefrom and terminating in central primary ejector nozzle 83, discharging into throat 84 of straight-through ejector duct 85 for forced injection of secondary airflow therein, such secondary airflow herein illustratively comprising the engine cooling airflow. Such type of engine exhaust jet pump cooling airflow system, per se, is fairly common design practice in modern aircraft. However, instead of dumping the resultant mixed flow overboard, as is customarily done, such effluent is herein discharged to aerodynamic advantage respecting wing 90 of aircraft 80. At the terminus of ejector duct 85, a T juncture is effected with terminal ducts 27—27 incorporated in trailing edge section 20 of wing 90 over a substantial spanwise extent thereof, the flow into ducts 27—27 being selectively controlled uniformly or differentially at said T juncture, by butterfly valve 86 operative by crank arm 86'. Accordingly, the continuously supplied engine cooling airflow incident to operation of primary powerplant 81, is discharged from terminal slot 24 as a relatively high velocity blowing jet over rounded trailing edge 25 to provide an effective fluid trailing edge for wing 90, with the previously described CC functions.

While the above mentioned CC functions are most effective in the slow speed range of the airplane, such a continuously-operative blowing jet also provides substantial drag reduction and enhanced thrust effects which are functional throughout the speed range, and obviously are especially important as to the net drag of the blunt-tailed jet airfoils of this invention in the high speed range of the airplane. These thrust-drag effects (comprising the thrust which varies complementally with jet lift and the drag which involves a more complex resolution of the resultant forces) are three in number: (1) pressure recovery on the bulbous trailing edge of the airfoil is essentially complete, i.e. the forwardly-acting or thrust-force component of the rear stagnation pressure developed on the terminal surface of the airfoil, by the previously described impingement of the divergent jet and the opposing local flow, tends to overcome the rearwardly-acting or drag-force component of the front stagnation pressure developed on the entry surface thereof, thus correspondingly attenuating (to that extent) the pressural drag effects on the airfoil; (2) the terminal blowing jet has a sink (i.e. suction) BLC effect upon the upper surface boundary layer flow, with resultant turbulent separation flow control thereof and correspondingly reduced viscous-shear drag; (3) the net effective drag of the airfoil will further be reduced as the consequence of the momentum added to the local flow by the thrust component of the blowing jet. Additionally to the foregoing considerations, it will further be understood that given sufficient jet momentum, at low and up to appreciable values of lift, the thrust will overcome the drag forces and the airfoil will become self-propulsive. At still higher values of lift, the related further shift toward each other of the respective front and rear stagnation points along the lower surface with reducing speed and relatively increasing jet velocity ratio, will progressively vector the thrust-drag components from stream-parallel into normal-to-the-stream components with corresponding enhancement of the lift forces due to the terminal blowing jet.

Again referring to these figures, a stand-by powerplant system is provided, comprising the battery 91, blower 92 driven by electric motor 93, controlled by switch 96. The discharge flow from blower 92 is conveyed through pipe 94 to annular outer primary ejector nozzle 95, which also discharges into throat 84 of ejector duct 85, with forced injection of secondary airflow therein similar to that provided by primary nozzle 83. It will be clear that such a stand-by powerplant system can be used either dependently in combination with the primary powerplant ejector system as a booster augmentation device relative thereto, or independently of primary powerplant operation for emergency use, within the stored-energy limits of battery 91.

As so far described respecting FIGURES 7, 8 and 9, it will be apparent that the essential feature of the invention—regardless of what the leading edge configuration of the airfoil may be and however any particular airfoil nose sections may contribute further to desired aerodynamic results—is the trailing edge or terminal blowing jet, per se, as shown by FIGURES 1 and 1a. It will therefore be understood that the leading edge section 50 of wing 90, as particularly shown by FIGURE 9, may if desired, be in accordance with the disclosure of FIGURE 3, actually, or transiently by means of the FIGURE 4 type including selective means to shut-off the leading edge blowing jet of the latter configuration, as shown by FIGURE 8.

In the illustrative case of FIGURES 7 and 9, the leading edge section of the airfoil incorporates nose duct 57 which likewise communicates with ejector duct 85, through rotatable sleeve valve 87, selectively controlled by lever 87'. In normal high speed flight valve 87 will be closed to render entry blowing slot 54 inoperative. But in the slow speed flight range valve 87 will be opened, so that the nose as well as the terminal circulatory jet will be operative. Also, and especially for the take-off maneuver, ejector duct 85 will preferably be energized by both the primary and stand-by powerplants, as will also normally be the case for the landing maneuver. However in the event of primary power failure, obviously only the stand-by powerplant will be available for emergency transient operation of either the terminal jet alone or both of the foregoing lift-increasing blowing jet systems.

In the FIGURE 7 aircraft application, the nose duct 57 terminates at the tip of wing 90 in generally rearwardly directed blowing jets as effected by flow-directing vanes 88, whereby the effluent jet is discharged in substantially a helical flow path over the sweptback tip section of wing 90, without separating therefrom, as indicated by the partial streamline 89. This is for the purpose of avoiding the wing tip stall phenomenon within the attainable angle of attack range of the aircraft, and to thus improve the lateral control thereof by means of aileron 97. The latter is controlled by drag link 99 pivotally connected to bell-crank 98, operative through cable controls 101—101 in a conventional manner, from pilot's control wheel 100. Cable 101 is also connected to crank arm 86' to control valve 86 functional with deflections of aileron 97, whereby upward aileron travel on the right-hand wing, for example, will be accompanied by relatively decreased flow from terminal blowing jet 24 on the same wing, and conversely, with increased relative flow from the terminal blowing jet 24 on the opposite left-hand wing, concurrently with downward aileron deflection on that wing. It will be understood that such pneumatic-type of lateral control system can, in the ultimate and alternatively, be used exclusively of any mechanical type aerodynamic surfaces for lateral control, as for instance by the omission of the aileron 97 and its attendant operating gear. That would comprise an acceptably safe design procedure with the type of system herein disclosed whereby reliable stand-by power is available for emergency operation of the lateral control system.

In passing it is pertinent to mention that in FIGURE 9, which is otherwise simplified for clarification, nose and terminal ducts 57 and 27 are respectively closed chordwisely by spanwisely-extending spars 103 and 102, not shown as such in FIGURE 7. Also, it will be noted in FIGURE 9 that, in relation to both the wing chord and to the midchord normal axis at right angles thereto, the airfoil is universally of bi-convex profile section, excepting the slot discontinuities. Likewise, that what is herein designated as the slot axis, comprising the straight line intersecting the slot efflux points, is slanted from the respective extremities of the airfoil and relative to the wing chord, oppositely from the relative rotation of the circulatory jet local flows over the leading and trailing edges. Further, that terminal slot 24 which is disposed in the generally negative pressure rear quadrant of the airfoil, may discharge over an arcuate trailing edge 25 of relatively small radius, as illustrated, while nose slot 54 which is disposed in the generally positive pressure front quadrant of the airfoil, may discharge over an arcuate leading edge 55 of appreciably larger radius, as illustrated. Alternatively, the dimensions of such respective radii may be reversed from the illustrative example of FIGURE 9, in other dual circulatory jet airfoil combinations wherein the slots may also have different gaps, proportions and relative dispositions. By way of further elucidation, the main wing of a fixed-wing aircraft in steady-state level flight, will have mostly negative relative pressure over its upper surface and mostly positive relative pressure on the lower surface thereof, while the horizontal tailplane of such an aircraft will normally have such pressures reversed. It will be understood that the FIGURE 9 type of circulatory jet airfoil, or other suitable airfoil combinations of the invention, may also very well be used to great advantage for the empennage surfaces of aircraft, since it would be very desirable in many types of aircraft, especially the high speed types, to eliminate movable control surfaces by substituting therefor even more effective, efficient and reliable pneumatic controls.

The theoretical illustration of FIGURE 10 comprises airfoil 104 which is assumed, for example, to be a combination of the FIGURES 1 and 4 trailing and leading edge respective airfoil sections wherein the momentum of the dual circulatory blowing jets has been maximized, for this particular blunt-tailed airfoil configuration, to provide directly (i.e. without change in angle of attack) essentially the optimum magnitude of jet-induced circulation which can be stabilized by the pneumatic means alone of this invention, as indicated by the convergence of front and rear stagnation streamlines 56 and 26, respectively, and intersection thereof at common stagnation point S approximately at the midchord position on the lower surface of the airfoil. This figure also indicates the general tendency with the blowing jet means of this invention, to couple the forward movement of the rear stagnation point with the rearward movement of the front stagnation point, as is characteristic of the Magnus-type circulation generally achieved by all flow control means of the invention herein disclosed, i.e. Magnus-type circulation is similar to that about a rotating cylinder wherein the streamlines are generally bilaterally symmetrical. Accordingly, to the extent that the streamlines are thus maintained bilaterally symmetrical about the midchord normal axis of the airfoil, the center of pressure due to the circulation-lift will be correspondingly proximate to the midchord point. Likewise, the direct thrust-lift reaction due to the jet, may be maintained essentially constant near the midchord (or respecting some other selected reference point by the pitching moment control means available in the reflexed-flap system of FIGURE 2).

In FIGURE 11 which is generally an enlarged view of the forward part of the FIGURE 4 leading edge section, in order to further clearly delineate specific design parameters for the nose circulatory blowing jet configuration of the invention, the leading edge radius of airfoil 50 centered at R, about which arcuate nose 55 of the basic airfoil is generated, is shifted upwardly and rearwardly along the line which maintains tangency of the respective peripheral curves at the upper surface to define angle $\beta$ relative to the chord of the airfoil (which angle will obviously vary according to the leading edge radii, camber and thickness ratio for particular airfoils) and establish a new radius center R' for the actual blowing jet nose configuration which is disposed so that the thus newly-developed arcuate nose 55' will be spaced internally from slot lip 58 of lower surface 52 (and within the basic airfoil nose profile 55) to provide the design slot width or gap for slot 54, and further establish the convergent internal surfaces of slot 54 leading into a substantially tangential juxtaposed relation at the effluent point thereof. The reference line 59 extending from the latter point at the edge of lip 58, to the original radius point R defines jet-lip angle $\theta$ below the chord of the airfoil, in this case, which angle in the preferred embodiment of the invention will be greater than $-45°$, i.e. a greater negative angle, though smaller angles than this may be used which, however, will render the blowing jet less effective and less efficient than somewhat larger jet-lip angles. The centers R and R' do not need to be so disposed as to maintain equal respective radii, the latter, in fact, often being less than the former. Alternatively, slot 54 can be constructed by simply continuing the basic nose curvature 55 internally of the airfoil, either as further generated about center R or as formed by a suitably modified curvature properly juxtaposed relative to slot lip 58.

Jet lip angle $\theta$ in FIGURE 11, particularly for high speed applications, will preferably be such that the front stagnation point on the airfoil (as at S in FIGURE 3, respecting its location only) will attain approximate coincidence with the efflux locus of slot 54 at normal cruising speed, so that the slot lip discontinuity in the region of arrested and substantially arrested local flow with an effectively inoperative jet, will not disrupt the usual downstream local regions of laminar boundary layers over the respective upper and lower surfaces of the airfoil, independently, for the most part, of whether the blowing jet is actually inoperative or has relatively low velocity ratio of the order $V_j/V_o < 1.5$, approximately. It has been demonstrated that this undershot jet location is also important at the higher lift-increasing velocity ratios, from the standpoint of economy, by comparative wind tunnel tests wherein the slot lip was progressively brought around the arcuate nose in several steps to final coincidence with the chord line at zero jet lip angle so that the jet was then directed exactly normal to the chord. As a typical example, the latter slot efflux location required some 50% higher jet velocity ratio and more than three times the power to achieve the same lift as that provided by the configuration having the jet lip angle $\theta=-48°$, in this case. That is readily understandable since the further the jet efflux point is carried around the leading edge toward the upper surface nose region of extremely high local flow velocity (at high values of lift) the higher must be the absolute velocity of the jet, in order to attain the same kinetic energy transfer to the local flow and thereby the same circulation lift augmentation. What actually counts, is the velocity differential between the jet and the immediately adjacent local flow, from which it obviously follows that the higher the latter velocity the higher must the jet velocity be in order to achieve the same lift-increasing effect. Since the local velocities are notoriously high precisely at the leading edge and near it over the upper surface, with substantial circulation over the airfoil, the prior art practice of locating the slot efflux point in this high velocity nose region inevitably results in a leading edge blowing jet of excessively high velocity that is both less effective and less efficient, by a wide margin, than that herein illustratively specified by FIGURE 11. Additionally, it is pertinent to mention that with the zero or positive jet lip angles of the prior art nose slots, the lips thereof act as small spoilers to immediately precipitate turbulent boundary layer flow over the upper surface when the jet is inoperative.

For the foregoing reasons, the rather precise coordination of the slot and airfoil configurations as related parameters of the jet momentum and normal operating speeds, is obviously of particular importance with respect to the design of the nose circulatory blowing jet configuration. FIGURE 11 is accordingly given as an illustrative design example thereof. However, as previously noted, FIGURE 11 inverted (corresponding to an enlarged rear portion of FIGURE 1) likewise denotes the similarly preferred design parameters for the terminal blowing slot which is the primary or basic element of the instant invention, wherein, for particular cases, the design parameters thereof may not be quite so critical. It is important to emphasize, on the other hand, that the terminal blowing slot must not be brought so far around the bulbous trailing edge to the positive pressure region of the airfoil, as to dissociate the BLC and CC sphere of influence of the rear circulatory jet upon the respective boundary layer and local flows within the airfoil negative pressure region. In other words, the jet must maintain effective contact with the negative pressure flow field. Also, as will be apparent from consideration of the FIGURE 1 (and FIGURE 11 inverted) configuration, such location of the terminal blowing slot will maintain peak upper surface negative pressure practically to the trailing edge, and the subsequent rapid pressure rise (as the jet diverges over the rounded surface) to substantially full freestream impact pressure at the rear stagnation point, will result in the terminal pressure distribution being generally similar to and pressural symmetrical with that over the nose of the airfoil. To the extent of this jet-maintained symmetry, the center of pressure with such type circulatory jet airfoils, will be correspondingly proximate to the midchord thereof, as is also functional with airfoil camber changes which the jets, in a sense, accomplish pneumatically and in an essentially ideal flow manner.

It will further be obvious that more than one blowing jet may alternatively be used in either the terminal or nose entry regions of circulatory jet airfoils, if there appears to be any such need. Multiple jets have been tested, but the simple combination adjacent to the respective airfoil extremities of the single blowing slots as herein specified, without flaps has been found to be sufficient to the purpose of attaining essentially the maximum possible circulation about the airfoil, virtually without separation, the stall in fact being eliminated through the range from approximately 90° negative angle of attack to practically 90° positive incidence. For applications requiring maximum lift in excess of the ultimate circulation-lift values, i.e. where the jet-reaction thrust-lift may range upwards of many times the jet-induced circulation-lift, then the direct-lift and flow control principles which are provided by the FIGURE 2 terminal configuration of the airfoil will obviously fulfill that requirement.

Additionally to the FIGURE 7 application to a typical fixed-wing aircraft of the dual circulatory jet airfoil combination of the invention, it is quite obvious that such a simple pneumatic type of flow control system (i.e. the aerodynamic aspects thereof as given by FIGURE 9) is a natural for the rotary-wing case, to provide appreciably improved helicopter performance. For example, with a basic rotor blade tip speed of 550 f.p.s. (ft./sec.), constant blowing jet velocity of 1030 f.p.s. (still subsonic), a normal cruise speed of 188 m.p.h. (275 f.p.s.), the tip jet velocity ratios cyclically attained automatically on the advancing and retreating blades, respectively, will thus be 1.25 and 3.75. Even with the latter relatively low jet velocity ratio, which will be higher inboard of the tips, the available high-lift test data indicate that the above order of cruise speed performance should be attained, probably accompanied by some increase in disposable load as well. Further, the previously mentioned favorable thrust-drag effects which have not so far been quantitatively evaluated, should materially reduce rotor torque as a by-product of such a lift-increasing system.

For the case of helicopter stub-wings, as in certain multi-engine configurations, which may be assumed to operate constantly at negative angles of attack due to rotor downwash, ranging from about −90° incidence in hovering to perhaps −7° at high speeds, there will be no occasion to delay the positive stall phenomenon, and thus no particular aerodynamic advantage to be gained from inclusion in the flow control system of the nose circulatory jet of the FIGURE 4 type. It will however be desirable to provide positive lift throughout the large range of negative incidence on the stub-wing. This can be accomplished by combining the FIGURE 2 type of flapped circulatory jet airfoil configuration with the plain FIGURE 3 leading edge section, given sufficient total blowing jet momentum, as appears is amply available (in a typical such case) by discharging the engine exhaust combined with the cooling airflow (if piston engines are used, otherwise simply the gas turbine efflux flow) from main blowing jet slot 39, while compressor bleed or other suitable air supply can be discharged from slot 34 to provide the desired terminal circulatory jet airfoil CC effects. Appreciable thrust with positive lift can thereby be maintained on the stub-wings at high normal cruise speeds and moderate negative incidence, while as the forward speed is reduced to the hovering performance regime, substantial positive-circulation-lift will be maintained down to large negative angles of attack with the relatively increasing jet velocity ratios, but the direct jet reaction thrust-lift will become progressively predominant with increasing angular deflection of the resultant high momentum jet by corresponding adjustment of the compound flap-nozzles system 36—36'—38. Thus, the stub-wing configuration that currently comprises a very considerable performance detriment in such type helicopters, can, by the compound circulatory jet airfoil flap means of this invention, be converted into a substantial incremental-useful-load component, primarily, together with improved partial powerplant performance.

In the case of convertiplan fixed-wings which may assume most if not all of the dynamic-lift of such type aircraft in the high speed range, the flow control problem will be of generally similar order but differing in degree compared to the foregoing helicopter stub-wing case, and excepting that the convertiplane wings will be more extensive and will operate at moderately positive incidence at high speeds. Accordingly, it may be desirable to use either the nose circulatory blowing jet of the FIGURE 4 type or the split-entry of the FIGURE 5 ejector-airfoil type, in combination with the FIGURE 2 type trailing edge section, so as to enhance the direct-lift capability of such fixed-wings. The natural further evolution of such composite-type aircraft, would dispense with the rotary-wing components thereof, since direct-lift as may be required, can be had in a primary-powered integral lift-propulsor fixed-wing system, by the several such combinations herein disclosed as related to those of said application Ser. No. 538,690.

For the case of modern jet transport aircraft and military airplanes normally operating at high subsonic speeds, the wing system may be comprised of the basic FIGURES 7 and 9 flow control combination, except of course, that the wing thickness ratio and leading edge radii would be suitably reduced to accord with the pre-critical compressible flow requirements. A futher operable feature of such a blunt-tailed circulatory jet airfoil system, might involve the use of continuous jet engine compressor bleed from terminal slot 24, so adjusted at normal cruising speed, to provide the optimum sonic jet velocity which will achieve minimal net drag effects and best over-all economy. The latter, however, in the supersonic case, may be achieved with the terminal blowing jet inoperative.

For certain supersonic types of aircraft, the FIGURE 6 type of sharp-entry flow control configuration, could be combined with either the FIGURES 1 or 2 types of blunt-tailed circulatory jet airfoil system. Additional, it is particularly desirable in such type aircraft to eliminate conventional movable control surfaces with their attendant aerodynamic and mechanical complications, which can be done by the pneumatic means of this invention, as previously pointed out. The FIGURE 6 type of supersonic entry section could, of course, be used in combination with any suitable type of trailing edge section, in view of the flow control merits of such a system in its own right. Further, while it may not be quite so obvious, it is within the scope of this invention to apply the FIGURE 6 type of blowing jet entry wege configuration, in duplicate, to comprise the composite upper and lower split-entry nose sections for a supersonic version of the FIGURE 5 type of leading edge configuration.

A further advantageous application of the basic flow control element of this invention, per se, relates to agriculture aircraft for crop dusting and spraying, wherein merely the terminal circulatory jet airfoil comprised of the simple FIGURES 1 and 3 combination, for instance, could utilize a relatively high jet velocity ratio to continuously attain high-lift (with relatively low drag) and thus large load capacity at moderate normal working speeds, with coincidentally enhanced operational safety. In such applications, the dust or spray might be dispensed from orifices adjacent to the rear stagnation point S, for improved dispersion thereof from the trailing edge of the wing. There will naturally be other appropriate applications for this elemental circulatory jet air-foil system of the FIGURES 1–3 type, such as in current types of propellered transport aircraft wherein elimination of mechanical type flaps and their attendant operating gear would be most welcome, along with the resultant improved take-off and landing performance, in particular, and probable improved cruise economy, reduced maintenance, and doubtless some saving in aircraft weight.

It will be understood that the elements of the invention herein disclosed are illustrative, and that functionally equivalent alternative structures may likewise be used, provided the recited functional effects are thereby obtained.

I claim as my invention:

1. A jet airfoil originating and terminating in respective leading and trailing edges and having a chord line intersecting said edges, a generally rounded convex rear surface including said trailing edge and a sharp-edge lip asymmetrically displaced therefrom and juxtaposed relative to said surface to form therewith a relatively fixed terminal slot disposed in said airfoil on the negative pressure side of said chord line for discharge of a blowing jet toward said trailing edge and tangentially with said surface and with the local circulatory flow externally of said lip to entrain and effect resultant confluent flow over said surface, duct means communicating with said slot and power means in communication with said duct for supplying pressurized fluid to said slot within selective limits of resultant blowing jet momentum, whereby said confluent flow is maintained effectively attached over said surface to the region of respectively equalized velocities and pressures incident to impingement thereof against the opposing local flow on the positive pressure side of said chord line whereat the rear stagnation streamline and associated stagnation point of said airfoil is pneumatically established and stabilized with consequent direct control of the circulation thereover within limits of magnitude functional with said jet momentum.

2. A blunt-tailed jet airfoil as recited in claim 1, wherein said power means include both primary and auxiliary power means, said terminal jet being continuously operable dependently functional with operation of said primary power means, said jet being transiently operable dependently functional with operation of said auxiliary power means, and wherein both of said power means may be used together to provide augmented operation of said jet.

3. A direct-lift self-propulsive jet airfoil comprising a blunt-tailed surface and a sharp-edged lip section juxtaposed unsymmetrically relative thereto, a chord line intersecting said surface and generally dividing the rear negative pressure quadrant from the rear positive pressure quadrant of said airfoil, relatively fixed and eccentric substantial arcs, one of said arcs originating internally of said airfoil and continuing externally to define said blunt surface, another of said arcs being spaced from said one arc and defining the internal face of said lip section, pressurized duct means in said airfoil communicating with said arcs to form therewith a relatively narrow supplemental blowing slot disposed in said negative quadrant for discharge of a relatively low-momentum circulatory jet contiguously over said surface and directed toward said positive quadrant, adjustable nozzle means communicating with said duct means and terminating in a relatively wide variable efflux main blowing slot comprising a major airfoil discontinuity disposed in said positive quadrant for discharge of a relatively high-momentum primary jet directed in one adjusted position of said nozzle means generally across the circulation about said airfoil and translationally with the freestream flow thereover and in opposition to said circulatory jet, compound flap elements of said nozzle means wherein an element thereof is adjusted to effect reflexed discharge of said primary jet and successive multiple adjustments of said elements divergently from said one position effect discharge of said primary jet directed progressively away from the translatory and toward the circulatory flows over said airfoil, power means for supplying pressurized fluid to said duct means, whereby said jets provide circulation and boundary layer control and primary-thrust generally complementary with substantial direct-lift effects for said airfoil functional with the efflux momentum of said jets.

4. A direct-lift self-propulsive jet airfoil as recited in claim 3, wherein the centers of pressure due both to the jet-reaction and to the jet-induced lift are maintained generally constant near the midchord of said airfoil substantially independent of said momentum and said adjustments.

5. A direct-lift self-propulsive jet airfoil as recited in claim 3, wherein said duct comprises separate components respectively communicating independently with said slots and with said power means.

6. A direct-lift self-propulsive jet airfoil as recited in claim 3, wherein the resultant reaction from said jets effectively moves forward on said airfoil functional with increasing effective angles of jet deflection.

7. A direct-lift self-propulsive jet airfoil as recited in claim 3, wherein said jets are effective throughout a selective range of said adjustments to provide Mangus-type circulation similar to that about a rotating cylinder with corresponding general fixation of the center of pressure and aerodynamic center of said airfoil near the midchord thereof.

8. A direct-lift self-propulsive jet airfoil as recited in claim 3, wherein the pitching moments on said airfoil are maintained throughout a selective range of said adjustments substantially constant independently of lift and irrespective of said momentum and the resultant effective angular deflection of said jets.

9. A direct-lift self-propulsive jet airfoil as recited in claim 3, wherein said airfoil is operatively effective independently of relative freestream flow thereover to provide direct jet-reaction lift complemental thrust and generally consatnt pitching moments associated therewith.

10. A direct-lift self-propulsive jet airfoil as recited in claim 3, wherein said one adjusted position provides pneumatically the effectively sharp trailing edge flow-breakaway functional characteristic of conventional airfoils with consequent fixation by interaction of said jets of the rear stagnation point of said airfoil on said blunt surface and said multiple adjustments provide confluent jet and local flow contiguously over said surface as effected by said circulatory jet from said rear negative quadrant flowing into said rear positive quadrant with consequent forward travel of said rear stagnation point as controlled by said multiple adjustments and said primary jet.

11. In a jet powered airfoil having generally biconvex sections relative both to the chord line and to the midchord normal axis thereof, juxtaposed surfaces forming nozzle means leading into and interposing discontinuity in at least one of said sections and operatively effecting relatively high velocity jet discharge from said means, power means dependently functional with powered operation of said airfoil for selectively supplying pressurized fluid to said nozzle means and an internal duct communicating with said means, whereby with relative freestream flow over said airfoil circulation generally similar to that about a rotating cylinder is established by said jet discharge as characterized by substantially symmetrical streamlines bilaterally of said axis and respectively coupled S-type or double reversal entry and terminal flows at the higher magnitudes of said circulation functional with the efflux momentum of said jet discharge, wherein said nozzle means comprise plural slots one of which is relatively fixed and disposed rearwardly in said airfoil on the generally negative pressure side thereof and the other of which is adjustable and disposed rearwardly in said airfoil on the generally positive pressure side of said airfoil and comprises plural movable elements with at least two said elements being respectively articulated both to vary the efflux width of said adjustable slot and to provide reflex control of said jet discharge to effect said S-type terminal flow in selected adjustments of said other nozzle means.

12. A jet airfoil having a blunt tail and generally biconvex external surfaces relative both to its chord line and to its midchord axis normal thereto and with freestream flow thereover being characterized by relative circulatory flow and the terminal confluent streamline and rear stagnation point associated therewith, said airfoil having a relatively narrow fixed terminal slot comprising single jet nozzle means asymmetrically disposed in one of said surfaces adjacent and directed toward said blunt tail and operatively discharging jet flow thereover in the direction of said circulatory flow and with subsequent impingement thereof generally against the local flow over the opposite said surface, internal duct means communicating with said nozzle and controllable power means in communication with said duct means for supplying pressurized fluid flow thereto, whereby said jet discharges at relatively higher velocity than said freestream flow and is effective to stabilize said confluent streamline and rear stagnation point and to control the location thereof over a relatively wide selective range and thus the magnitude of the circulation over said airfoil functional with the relative velocities of said jet and freestream flow.

13. A jet airfoil as in claim 12, and a second relatively wide jet nozzle having adjustable flap elements in said opposite surface for controlling within preselected limits the effective reaction point on said airfoil of the jets operatively discharging therefrom, said second nozzle being in communication with said duct means, whereby said reaction point may be maintained essentially constant throughout the normal flight operable range of said adjustable flap elements.

References Cited in the file of this patent

UNITED STATES PATENTS

| | | |
|---|---|---|
| 1,580,577 | Baumann | Apr. 13, 1926 |
| 1,879,717 | Sikorsky | Sept. 27, 1932 |
| 2,041,792 | Stalker | May 26, 1936 |
| 2,406,916 | Stalker | Sept. 3, 1946 |
| 2,478,725 | Trey | Aug. 9, 1949 |
| 2,885,160 | Griswold | May 5, 1959 |

FOREIGN PATENTS

| | | |
|---|---|---|
| 596,884 | France | Aug. 17, 1925 |